Sept. 11, 1956          C. B. SHEERIN          2,762,481
                    CLUTCH CONTROL MECHANISM
Filed Aug. 17, 1954                            2 Sheets-Sheet 1

INVENTOR.
CLEO B. SHEERIN
BY Paul O. Pippel
ATTY.

Sept. 11, 1956   C. B. SHEERIN   2,762,481
CLUTCH CONTROL MECHANISM
Filed Aug. 17, 1954   2 Sheets-Sheet 2

INVENTOR.
CLEO B. SHEERIN
BY Paul O. Pippel
ATTY.

United States Patent Office 2,762,481
Patented Sept. 11, 1956

2,762,481

CLUTCH CONTROL MECHANISM

Cleo B. Sheerin, Fort Wayne, Ind., assignor to International Harvester Company, a corporation of New Jersey Application August 17, 1954, Serial No. 450,410

12 Claims. (Cl. 192—94)

This invention relates to a clutch actuating and disengaging mechanism and more particularly to a clutch control means for a resiliently mounted power plant such as is used in motor vehicles.

It is customary in present day motor vehicle design and construction to mount the power plant or engine flexibly upon the supporting or chassis frame by means of resilient mounting pads or comparable structure, in order to avoid transmission of engine-developed vibration to the car body, by permitting the power plant to oscillate about a longitudinally extending axis and move fore and aft as well during operation of the same. The clutch housing as well as the transmission casing are generally secured to the engine and, hence, move relatively to the chassis frame with the engine. Thus, since the clutch control or pedal member is usually mounted transversely with respect to the axis of oscillation as well as the fore and aft movement of the power plant on the frame while the clutch throwout lever or disengaging member remains positioned within the clutch housing, the problem of transmitting controlling motion between the clutch pedal and throwout mechanism and yet permit a certain amount of relative movement between the members has received considerable attention in the industry. It is, therefore, the primary objective of the present invention to provide a novel, simple, inexpensive, and highly effective clutch control construction whereby a resilient yet positive connection is obtained between the clutch pedal and the clutch disengaging member that will accomplish the two-fold objective of permitting a resiliently mounted power plant to freely oscillate and simultaneously therewith move fore and aft along a longitudinal axis without transmitting such motions and the objectionable chatter resulting therefrom to the clutch pedal.

Another object is to provide a stationary, pivotally mounted clutch pedal connected with the clutch throwout mechanism affixed to a resiliently mounted vehicle power plant by means of a unique linkage.

Still another object of the invention is the provision of linkage means between a clutch control pedal, pivotally mounted for angular movement on a vehicle frame, and a clutch throwout mechanism resiliently mounted with respect to the frame, wherein positive control motion may be transmitted through the linkage means when the actuating force is applied to the clutch pedal in its ordinary mode of operation that will prevent the relative motion of the vehicle power plant and clutch from being transmitted to the clutch pedal.

A further object is the provision of a novel connection between a control member mounted on the vehicle chassis frame and operable from within the vehicle body with a mechanism mounted on a resiliently mounted power plant, which connection will not rattle or transmit vibration to the vehicle body and which at the same time will give constant and positive control of the mechanism mounted on the power plant.

Still another object is the provision of linkage means for interconnecting a clutch control pedal mounted on the vehicle frame and a clutch throwout lever mounted on a resiliently mounted power plant which includes a cable and a screw and nut assembly of the ball bearing type.

The foregoing and other important objects and desirable features inherent in and encompassed by the invention, together with many of the purposes and uses thereof, will become readily apparent from a reading of the ensuing description in conjunction with the annexed drawings in which.

Figure 1:
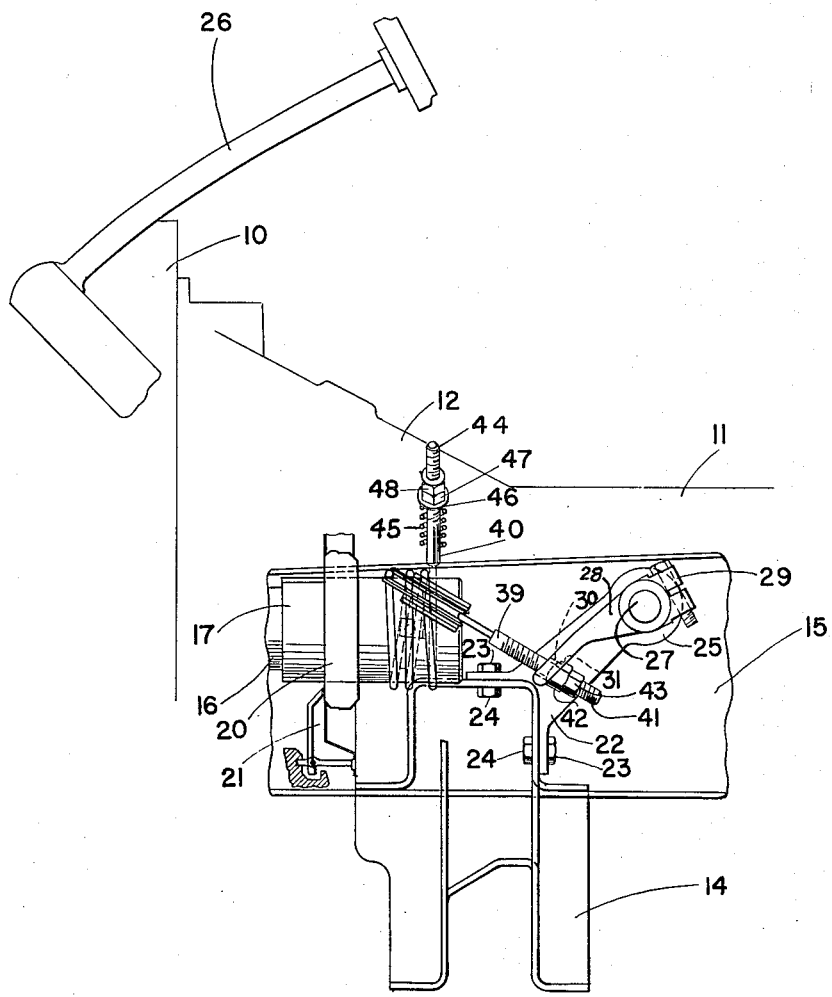
Figure 1 is a side elevational view of a clutch control mechanism embodying the invention.
Figure 2:
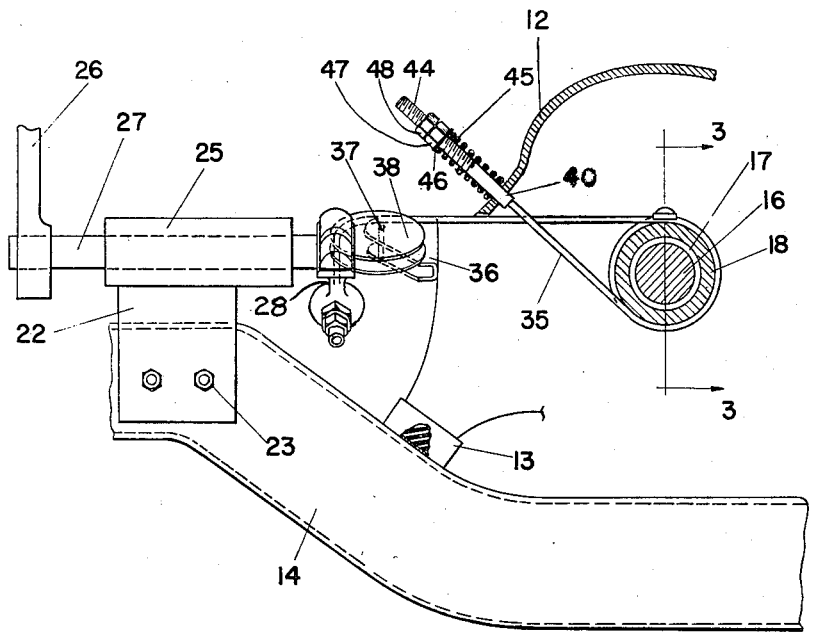
Figure 2 is a rear elevational view of a resiliently mounted power plant showing a clutch control mechanism therefor, the clutch control mechanism having portions broken away to better illustrate its construction.

Referring to the drawings in detail wherein like numerals represent like elements throughout the various views, there is shown a portion of an internal combustion engine or power plant 10 shown somewhat diagrammatically. The change speed gearing for the motor vehicle is enclosed in a transmission casing 11, partially illustrated in Figure 1. A bell-shaped clutch housing 12 is attached to the rear end of the engine 10 and to the forward end of the transmission casing 11 by bolts or other suitable means. The engine 10, transmission casing 11 and clutch housing 12 are resiliently mounted on mounting pads 13, only one of which is shown in Figure 2. The mounting pad 13 is rigidly secured to a transversely extending cross member 14 which has its ends rigidly connected to longitudinally extending channel-shaped side sill members 15, only one of which is shown. Side sill members 15, cross member 14 and other cross members not shown but rigidly interconnecting the side sill members 15 constitute the vehicle supporting or chassis frame. It will be appreciated that the engine 10, transmission casing 11 and clutch housing 12, which are shown somewhat diagrammatically, are resiliently supported on the chassis frame in accordance with conventional mounting practices, and since such features form no specific part of the present invention the details thereof have not been otherwise amplified in the drawings. However, it is to be understood that the entire power unit which includes the engine 10, transmission casing 11 and clutch housing 12 is free to rock about a longitudinally extending axis and may also move forwardly and rearwardly relative to the chassis frame, as in conventional motor vehicle constructions.

Figure 3:
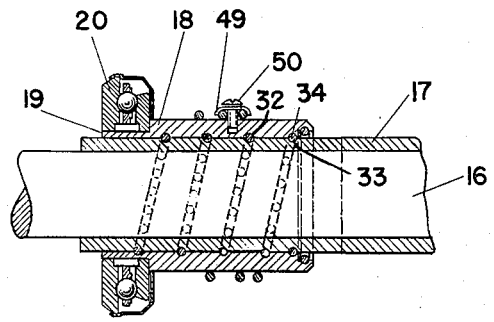
Figure 3 is a sectional view taken substantially along the line 3—3 of Figure 2.

The vehicle drive shaft 16 extends longitudinally through a tubular bearing retainer 17 which is attached to the transmission casing 11 and extends longitudinally into the clutch housing 12. As shown in Figure 3, a clutch release bearing sleeve 18 is mounted on the tubular bearing retainer 17 and has a reduced diameter end portion 19. A conventional clutch release bearing is carried by the reduced diameter portion 19. Axial movement of the release bearing 20 to the left as viewed in Figure 3 rocks a plurality of fingers, one of which appears at 21, which fingers serve to separate suitable driving members from the driven plate or plates of a conventional clutch mechanism (not shown).

The clutch control mechanism includes a transverse bracket member 22 which is rigidly connected to a portion of the cross member 14 by means of bolts 23 and nuts 24. The bracket member 22 extends upwardly and rearwardly from the cross member 14 and is provided with an integrally-formed bearing sleeve 25. A clutch control pedal 26 is securely keyed to the outermost end of a transversely extending shaft 27. The shaft 27 extends through and is rotatably journaled in the bearing sleeve 25. As shown in Figures 1 and 2, one end of an arm 28 is clamped to the inner-most end portion of the shaft 27 by suitable means indicated at 29. The other end of the arm 28 is enlarged as shown in Figure 2 and is provided with a slot 30 therethrough, as shown in Figure 1. It will be noted that one surface of the enlarged end portion of the arm 28 is provided with a semi-spherical seat 31, the purpose of which will be explained hereinafter.

The thrust bearing sleeve 18 internal surface is provided with a spiral groove 32 having a cross section slightly less than a semi-circle. The portion of the drive shaft bearing retainer 17 upon which the sleeve 18 is mounted is provided with a complemental groove 33 corresponding in pitch to the pitch of the sleeve groove 32 and of a cross section also slightly less than a semi-circle. When the grooves 32 and 33 are located to coincide, they will form a spiral channel of substantially circular cross section in which are inserted a plurality of anti-friction balls 34 which interconnect the sleeve 18 and the bearing retainer 17 and affect the axial movement of one member relative to the other upon rotation of the former. From the foregoing it will be appreciated that rotation of the sleeve in a counterclockwise direction, as viewed in Figure 2, will effect linear travel of the sleeve 18 and thrust bearing 20 to the left, as viewed in Figure 3, to cause rocking of the fingers 21 to disengage or release the clutch. Prior to applicant's invention, the thrust bearing was generally moved axially with respect to the bearing retainer by means of a yoke or fork which was suitably connected to a clutch disengaging shaft extending transversely of and spaced above the drive shaft. The yoke or fork generally engaged the bearing sleeve on diametrically opposite sides thereof and since the clutch disengaging shaft was spaced vertically above the drive shaft, the axial thrust on the bearing and thus on the fingers was not always uniformly distributed because after long periods of use the mating parts would wear and become loose and since the actuating force was transmitted at only two points to the sleeve, the sleeve and bearing cocked and sometimes jammed itself upon the bearing retainer. With applicant's device the axial thrust of the sleeve and bearing is always uniformly distributed on the fingers.

In order to transmit movement from the clutch pedal 26 to the clutch thrust bearing sleeve 18, a control cable 35 is provided. Attached to the side wall portion of the clutch housing 12 is a bracket 36 which has a pair of upstanding legs for supporting a pivot pin 37. The pin 37 serves to rotatably support a pulley 38 provided with a V-shaped groove and may be conveniently made by joining two stamped wheels having tapered flanges. The opposite end portions of the cable 35 are connected to coupling elements 39 and 40, respectively. The coupling element 39 is provided with a threaded end portion 41 which extends through the slot 30 formed in the arm 28. A nut 42 having a semi-spherical surface complemental to the seat 31 is threaded on the end portion 41 and is adapted to engage the seat 31. A jam nut 43 is also threaded on the end portion 41 of the coupling element 39 for engaging the nut 42 to lock the same in place. From the connection of the coupling element 39 to the arm 28 the control cable 35 extends to and is disposed within a segment of the pulley groove. The control cable 35 extends transversely, horizontally from the pulley 38 through a suitable aperture formed in the clutch housing 12 and is wrapped about the bearing sleeve 18 slightly less than 2¾ times. As best shown in Figure 2, coupling element 40 is slidable in an opening formed in the clutch housing 12 and is provided with a threaded end portion 44 similar to threaded end portion 41 of coupling element 39. A helical-wound spring 45 encircles the coupling element 40 and is exposed exteriorly of the clutch housing 12. One end of the spring abuts the clutch housing 12 and its opposite end abuts a washer 46 slidable on the coupling element 40. A nut 47 is threaded on the end portion 44 of the coupling element 40 and is adapted to engage the washer 46. A jam or lock nut 48 is also threaded on the end portion 44 for locking the nut 47 in place. The cable 35 is secured to the sleeve 18 by means of a small clip 49 having its edges turned down for embracing adjacent sections of a pair of cable loops. The clip 49 is secured to the sleeve 18 by a screw 50 threaded into a threaded aperture formed in the sleeve 18. From the foregoing it will be apparent that spring 45 tends to rotate the sleeve 18 in a clockwise direction, as viewed in Figure 2. Such rotational movement of the sleeve 18 also causes the sleeve to move to the right as viewed in Figure 1 to its clutch engaging position.

In operation, pressing down on the clutch pedal 26 by the vehicle operator will draw one end of the cable 35 to the rear which motion is carried around the pulley 38 and results in the other end of the cable being drawn toward the sleeve 18. Inasmuch as the cable 35 is wrapped around the sleeve 18 and secured thereto, such motion causes the sleeve 18 to rotate with respect to the tubular bearing retainer 17 and move axially to disengage the clutch. Since the cable 35 is the only continuous connection between the power plant and the clutch pedal 26 and is incapable of transmitting any vibration between the power plant and the clutch pedal, a simple and novel means for transmitting positive clutch control movement from the clutch pedal to a clutch disengaging member is obtained.

Upon release of the clutch pedal 26 by the vehicle operator, the spring 45 together with the conventional clutch springs will tend to rotate sleeve 18 in a clockwise direction, as viewed in Figure 2, and through the medium of the cable 35 such movement will return the clutch pedal 26 to its initial position.

Since the vehicle power plant is resiliently mounted on the chassis frame, it will be understood that in accordance with well known principles, as the speed of the engine or of the vehicle varies as a result of torque changes or otherwise the engine may oscillate with a variable frequency about a longitudinal axis or may reciprocate in a fore and aft motion along the same axis. Such motion may occur independently or simultaneously and if transmitted to the clutch pedal will set up a vibration and/or chatter in the pedal that will not only be extremely annoying to the occupants of the vehicle but will additionally cause excessive wear in all the associated linkage. In the present invention the transmission of such objectionable vibration through the control mechanism is avoided by providing for the dissipation thereof before it reaches the clutch pedal in a manner hereinbefore explained. Not only are the vibrations effectively dissipated by the means interconnecting the clutch pedal and the clutch disengaging member but such dissipation is accomplished without impairing the desired actuating movement of the clutch pedal which is transmitted to the clutch disengaging member.

The embodiment of the invention chosen for the purposes of illustration and description herein is that preferred for achieving the objects of the invention and developing the utility thereof in the most desirable manner. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. In a vehicle having a chassis frame and an engine yieldably mounted thereon; a control member on said frame; an operating member carried on said engine, and a cable attached to said control member, said cable extending about and operatively engaging said operating member.

2. In a vehicle having a chassis frame and an engine yieldably mounted thereon; a control member movable on said frame; an operating member carried by said engine for rotational movement; and a cable attached to said control member, said cable being looped about the rotational axis of said control member and operatively engaging said control member.

3. In a vehicle having a chassis frame and an engine yieldably mounted thereon and including a clutch; a clutch control member movable on said frame; a clutch operating member carried on said engine for simultaneous rotational and axial movement; and means for operatively interconnecting said control member and said operating member including a flexible cable whereby movement of said control member effects simultaneous rotational and axial movement of said operating member.

4. In a vehicle substantially as set forth in claim 3, in which, said means includes a cable attached to said control member, said cable being looped about the rotational axis of said control member and operatively engaging said control member.

5. In a vehicle having a chassis frame and an engine resiliently mounted thereon; a rotatable operating member carried by said engine; and a cable for rotating said operating member from said frame, said cable being looped about the rotational axis of said operating member and operatively engaging said operating member.

6. In a vehicle having a chassis frame and an engine resiliently mounted thereon; a rotatable operating member carried by said engine; a cable for rotating said operating member from said frame, said cable extending about the rotational axis of said operating member and operatively engaging said operating member; and a pulley carried by said engine for directing said cable.

7. In a vehicle having a chassis frame and an engine yieldably mounted thereon, including a clutch; a clutch control member pivotally mounted on said frame; a clutch operating member carried on said engine for simultaneous rotational and axial movement; and means interconnecting said control and operating members whereby pivotal movement of said control member effects simultaneous rotational and axial movement of said operating member including a cable having one end attached to said control member and having a section thereof intermediate its ends operatively engaging said operating member.

8. In a vehicle substantially as set forth in claim 7, in which, said operating member has a cylindrical outer surface and said cable extends at least once about the rotational axis of said operating member and operatively engages the outer surface of said operating member.

9. In a vehicle having a chassis frame and a power plant resiliently mounted thereon including a clutch, clutch housing, and transmission casing, said transmission casing having a tubular portion extending into said clutch housing and having an external spiral groove thereon; a clutch control member pivotally mounted on said frame; a clutch operating sleeve mounted on said tubular portion and having an internal spiral groove to cooperate with the external spiral groove of said tubular member; a pulley secured to said clutch housing; and a cable having one end attached to said control member, said cable passing about said pulley and having a section thereof continuously disposed about said operating sleeve and operatively engaging the outer surface thereof.

10. In a vehicle having a longitudinal chassis frame and a power plant yieldably mounted thereon including a clutch, an engine, a clutch housing rigidly secured to the rear end of said engine, and a transmission casing rigidly secured to the rear end of said clutch housing, said transmission casing having a tubular portion extending longitudinally into said clutch housing and having an external spiral groove thereon; a clutch control member pivotally mounted on said frame for rocking movement about a horizontal, transversely extending axis; a clutch operating sleeve mounted on said tubular portion and having an internal spiral groove to cooperate with the external spiral groove of said tubular portion in receiving a series of balls, said sleeve simultaneously traveling axially upon rotation thereof; and means interconnecting said control member and sleeve whereby rocking movement of said control member effects simultaneous axial and rotational movement of said sleeve.

11. In a vehicle substantially as set forth in claim 10, in which, said means interconnecting said control member and sleeve includes a cable having one end attached to said control member and its opposite end yieldably connected to said clutch housing, said cable having a section thereof intermediate its ends continuously disposed about and operatively engaging said sleeve.

12. In a vehicle having a longitudinal chassis frame and a power plant yieldably mounted thereon including a clutch, an engine clutch housing rigidly secured to the rear end of said engine, and a transmission casing rigidly secured to the rear end of said clutch housing, said transmission casing having a tubular portion extending longitudinally into said clutch housing and having an external spiral groove thereon; a transversely extending shaft journalled on said frame; a clutch pedal secured to said shaft; an arm secured to one end of said shaft for rocking movement therewith; a cylindrical clutch operating sleeve mounted on said tubular portion and having an internal spiral groove to cooperate with the external spiral groove of said tubular portion in receiving a series of balls, said sleeve simultaneously traveling axially upon rotation thereof; a pulley secured to said clutch housing; a cable having one end attached to the free end of said arm, said cable passing about said pulley and being wrapped about and operatively engaging the outer surface of said sleeve; and resilient means for connecting one end of said cable to said clutch housing including a coil spring having one end abutting said clutch housing and its opposite end abutting said cable.

References Cited in the file of this patent

UNITED STATES PATENTS

| | | |
|---|---|---|
| Re. 23,865 | Curry | Aug. 31, 1954 |
| 2,029,165 | Hadley et al. | Jan. 28, 1936 |
| 2,038,981 | Beringer | Apr. 28, 1936 |
| 2,232,302 | Auten | Feb. 18, 1941 |
| 2,253,592 | Wahlberg | Aug. 26, 1941 |
| 2,297,913 | Phelps | Oct. 6, 1942 |
| 2,324,021 | Plexico | July 13, 1943 |
| 2,675,105 | Kelley | Apr. 13, 1954 |